United States Patent
Mont et al.

(10) Patent No.: US 7,107,449 B2
(45) Date of Patent: Sep. 12, 2006

(54) DIGITAL CERTIFICATES

(75) Inventors: Marco Casassa Mont, Gifford (GB); Richard Brown, Cottrell (GB); Brian Quentin Monahan, Sodbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 867 days.

(21) Appl. No.: 10/075,445

(22) Filed: Feb. 15, 2002

(65) Prior Publication Data

US 2002/0120848 A1 Aug. 29, 2002

(30) Foreign Application Priority Data

Feb. 17, 2001 (GB) ................... 0103970.0

(51) Int. Cl.
*H04L 9/00* (2006.01)
*H04K 1/00* (2006.01)
*G06Q 99/00* (2006.01)

(52) U.S. Cl. ............... 713/175; 713/156; 713/168; 713/170; 726/10; 705/76

(58) Field of Classification Search ........... 713/156; 705/76
See application file for complete search history.

(56) References Cited

U.S. PATENT DOCUMENTS

| | | | | |
|---|---|---|---|---|
| 4,868,877 A | | 9/1989 | Fischer et al. | |
| 5,311,591 A | * | 5/1994 | Fischer | 713/156 |
| 5,412,717 A | * | 5/1995 | Fischer | 713/156 |
| 5,579,479 A | | 11/1996 | Plum | 395/188.01 |
| 5,659,616 A | * | 8/1997 | Sudia | 705/76 |
| 5,877,485 A | | 3/1999 | Swartz | 235/383 |
| 5,978,484 A | * | 11/1999 | Apperson et al. | 713/170 |
| 6,069,647 A | * | 5/2000 | Sullivan et al. | 725/29 |
| 6,189,097 B1 | * | 2/2001 | Tycksen et al. | 713/156 |
| 6,292,569 B1 | * | 9/2001 | Shear et al. | 713/155 |
| 6,321,339 B1 | | 11/2001 | French et al. | 713/201 |
| 2002/0116367 A1 | * | 8/2002 | Brown et al. | 707/1 |
| 2002/0120848 A1 | | 8/2002 | Mont et al. | |

FOREIGN PATENT DOCUMENTS

| | | |
|---|---|---|
| EP | 0 869 637 | 10/1998 |
| GB | 2 357 225 | 6/2001 |
| WO | 99/19845 | 4/1999 |
| WO | 01/06727 | 1/2001 |
| WO | 01/33797 | 5/2001 |

OTHER PUBLICATIONS

Housley et al.. "Internet X.509 Public Key Infrastructure Certificate and CRL Profile," The Internet Society (1999), pp. 1-105, Feb. 2, 2002, ftp://ftp.isi.edu/in-notes/rfc2459.txt.

* cited by examiner

*Primary Examiner*—Gilberto Barrón, Jr.
*Assistant Examiner*—Laurel Lashley
(74) *Attorney, Agent, or Firm*—Foley & Lardner LLP

(57) ABSTRACT

The present invention provides a digital certificate (2, 32) comprising a plurality of credential attribute properties (6, 36), and a trust function (8, 42) embedded within the certificate as an executable file, which trust function can determine as a function of data (12, 44) available to it a trust value (14, 46) attributable to at least a part of the certificate at least partly by execution of the executable file. A corresponding method of communication is also disclosed.

2 Claims, 2 Drawing Sheets

DIGITAL CERTIFICATES

FIELD OF THE INVENTION

The present invention relates to digital certificates and to methods of communication.

BACKGROUND OF THE INVENTION

A credential is a data structure provided to a bearer for a purpose, with some acknowledged way to verify the bearer's right to use the credential. A credential relates to an attribute, normally, but not necessarily, of the bearer. A credential is verified by a trusted source (sometimes referred to as the verifier). Often, there will be a chain of credentials and respective trusted sources until a verification is proffered by an organization in which trust is implicit. Credentials are incorporated in a digital certificate for verification.

A digital certificate generally comprises a file containing information, which file is transmitted to a recipient together with a digitally signed version thereof. The digitally signed version is a hash of the file encrypted using a secret key (in a public key infrastructure). A hash is a one-way function that generates a substantially unique output from a file and is for all practical purposes irreversible. These concepts are familiar to those skilled in the art.

Digital certificates are used in communication using distributed electronic networks, such as the internet, to transmit a credential, typically of the bearer. A known digital certificate is the X.509 standard.

A certificate may contain one or more credential attributes.

A credential attribute in a certificate can be almost anything. Typical examples relevant to the present invention may be a credit rating, an access authorization (for physical or electronic access), a verification of identity etc.

Each attribute has at least one attribute property, such as a value (e.g. a numeric or alphanumeric) or something more complex such as an indication of trust.

Generally, known digital certificates are valid for a fixed period of time (e.g. 1 year), during which time they will be used as a means of authentication and for gaining authorized access to services etc. This is referred to as the valid period. Such digital certificates can, however, be revoked at any time by the verifier (terminating the valid period), thus placing a burden on the certificate recipient to check revocation lists or to use online certificate status protocol services. These certificates are generally valid or not valid; there is no middle ground even though the degree of trust the trusted source has in the credential attribute may, in fact, vary over time (or some other variable) or if there is a wish to vary the credential attribute value.

A certificate may still be in a valid period even if a credential attribute within it is not.

By way of example, a certificate may specify an individual's credit limit as a credential attribute. In this example, the credential attribute property value is the value of the credit limit. While this may be correct at the time of generation of the certificate, within the typical one year limit of the certificate, the verifier may not wish to attest to the same credit limit for the full period.

Even if the certification can be varied, the recipient may still need to assess the trustworthiness of the certificate or parts thereof. In particular, the recipient would wish to know what degree of trustworthiness the certificate issuer would give to the certificate or a part thereof. While it is known from U.S. Pat. No. 4,868,877 to associate a level of trust, in numerical form, to a credential or certificate, this does not address the problem of trust varying subsequent to issuance of the certificate or for other factors.

SUMMARY OF THE INVENTION

Preferred embodiments of the present invention aim to address the problems referred to above.

According to the present invention in a first aspect, there is provided a digital certificate comprising a plurality of credential attribute properties, and a trust function embedded within the certificate as an executable file, which trust function has data can determine as a function of data available to it a trust value attributable to at least a part of the digital certificate at least partly by execution of the executable file.

In embodiments of the present invention the trust function uses data to generate a trust value the recipient can associate with one or more attributes in the certificate or with the certificate as a whole. Generally, but not exclusively, the trust function uses trust values of attributes to generate what can be described as a composite or global trust value.

Thus, the digital certificate can be used locally and dynamically to determine a trust value.

Suitably, the trust value is of a credential attribute in the certificate. Suitably, the trust value is of the certificate.

Suitably, the data is trust value data.

Suitably, the data includes data obtained externally of the certificate. Suitably, the obtained data is obtained from a user by the input of data in response to a query generated by the trust function. Suitably, the obtained data is obtained from a digital data store. Suitably, the digital data store is a web site.

Suitably, the trust function varies the trust value as a function of time.

Suitably, the trust function is configured to determine the trust value automatically. Suitably, execution of the executable file fully can determine the trust value. Suitably, the executable file is a platform portable code, such as Java Script or HTML.

Suitably, the certificate had a valid period and the credential function determines the credential attribute property value during the valid period.

Suitably, the plurality of credential attribute properties are from a single credential attribute. Suitably, the plurality of credential attribute properties are from a plurality of credential attributes.

Suitably, there is at least one attribute trust value, in which the trust function uses an attribute trust value to determine the trust value. Suitably, there is a plurality of credential attributes and a plurality of attribute trust values, in which the trust function uses a plurality of attribute trust values to determine the trust value.

Suitably, a credential function is provided in the certificate, which credential function is associated with at least one credential attribute property and which determines the value of the credential attribute property.

Suitably, the trust function uses the credential attribute property value determined by the credential function. Suitably, the credential attribute property value determined by the credential function is a trust value.

Suitably, the certificate has a valid period and the trust function determines the trust value during the valid period of the certificate.

The "trust" value and the "property" value need not be numerical values, though generally they will be so. Numerical property values may relate to a numerical attribute, e.g. a credit rating, or be a numerical representation of a trust value in a particular credential attribute e.g. that of identity of the bearer. Typically, for a trust value, the value will be between a zero trust number (say '0' or '−1') and a full trust number (say '1') attributing a high confidence level to the credential. The attribute function may be monotonically decreasing over time.

Other values may be alphanumeric e.g. "YES"/"NO" outputs or relate to preset word based indications such as "HIGH TRUST", "MEDIUM TRUST" or "LOW TRUST".

Suitably, the credential function varies the credential attribute property value as a function of time.

Suitably, the credential function is configured to determine the credential attribute property value automatically. Suitably, execution of the executable file fully can determine the credential attribute property value. Suitably, the executable file is a platform portable code, such as Java Script or HTML.

Suitably, the credential attribute property comprises a value operated on by the credential function to determine a credential attribute property value.

Suitably, the credential function uses data obtained from outside the certificate to determine the credential attribute property value. Suitably, the obtained data is obtained from a user by the input of data in response to a query generated by the credential function. Suitably, the obtained data is obtained from a digital data store. Suitably, the digital data store is a web site.

Suitably, a plurality of the credential attribute properties have respective credential functions. Suitably, each credential attribute property has a respective credential function.

By having the trust and, optionally, credential functions within the certificate it can be trusted by the recipient as a verified determination of the trust value of a part or all of the certificate and, optionally, credential attribute property value.

According to the present invention in a second aspect, there is provided a digital certificate comprising a plurality of credential attribute properties and a trust function within the certificate, which trust function comprises an executable file, which trust function has data available to it and can determine as a function of the data available to it a trust value attributable to at least a part of the digital certificate at least partly by execution of the executable file.

According to the present invention in a third aspect, there is provided a digital certificate comprising a plurality of credential attribute properties, and a trust function embedded within the certificate as an executable program, which trust function has data available to it and can determine as a function of the data available to it a trust value attributable to at least a part of the digital certificate at least partly by execution of the executable program.

According to the present invention in a fourth aspect, there is provided a method of communication, which method comprises the steps of communicating from a sender to a recipient a digital certificate according to any of the first to third aspects of the invention.

Suitably, the recipient inspects the certificate and the trust value is determined by the trust function.

Suitably, the recipient inspects the certificate and the credential attribute property value is determined according to the credential function.

Suitably, the communication is via a distributed electronic network.

BRIEF DESCRIPTION OF THE DRAWINGS

The present invention will now be described, by way of example only, with reference to the drawings that follow; in which.

DETAILED DESCRIPTION OF THE EMBODIMENTS

Figure 1:
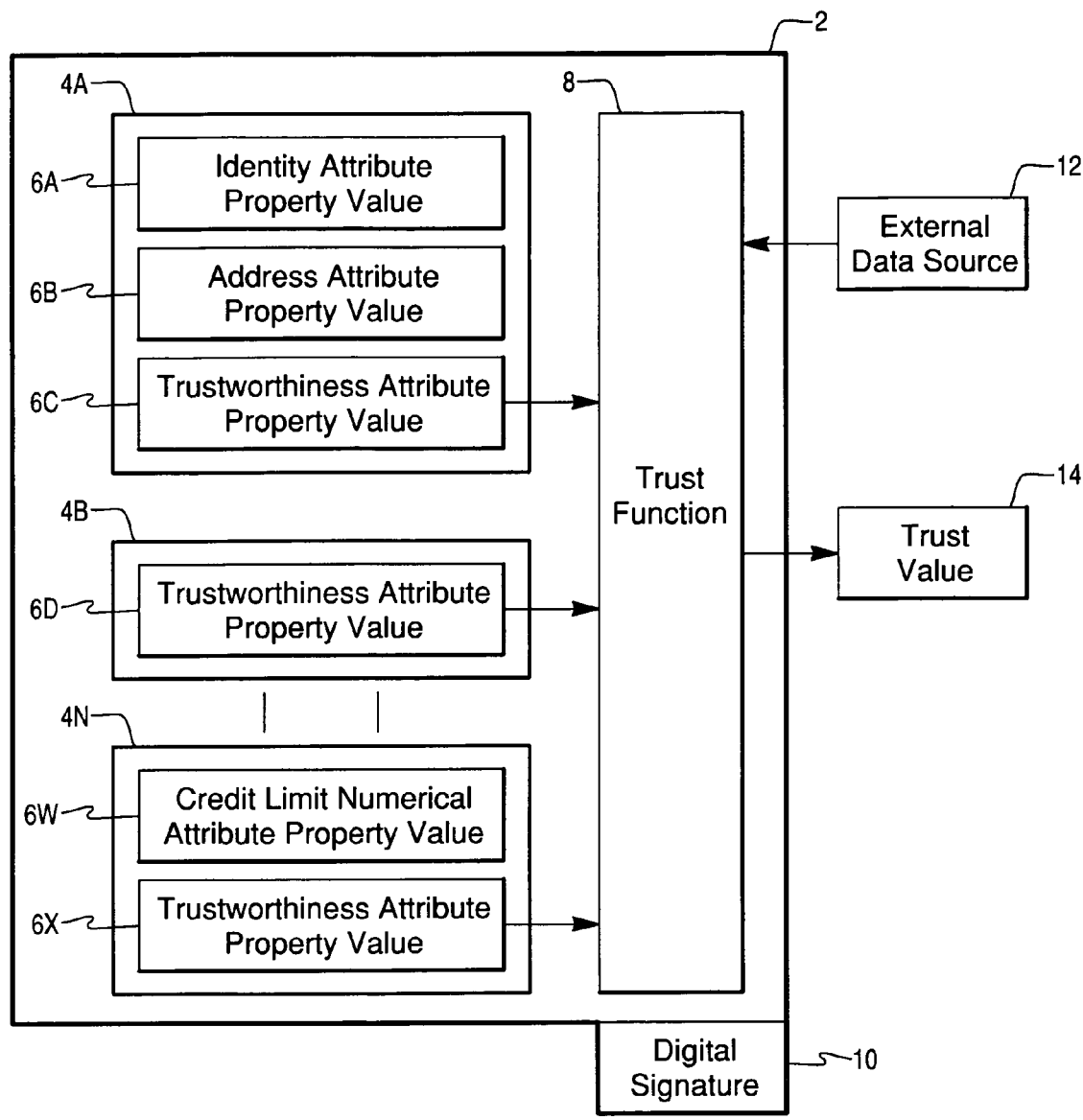
FIG. 1 is a schematic representation of a digital certificate according to a first embodiment of the present invention.

Referring to FIG. 1 of the drawings that follow there is shown, schematically, a digital certificate 2 according to the X.509 standard, the certificate 2 containing credential attributes 4A–4N, which have credential attribute properties 6A–6X and a trust function 8. The certificate 2 is digitally signed (a hash created, which hash is encrypted using a verifier's secret key) as indicated schematically at 10. A source of external data is indicated schematically at 12.

The credential attribute 4A relates to a bearer's identity and contains an identity attribute property value 6A (eg "FRED SMITH"), an address attribute property value 6B and an indication of trustworthiness attribute property value 6C (a numerical value between −1 (completely untrustworthy) and +1 (completely trustworthy)). Credential attribute 4B is for and has a trustworthiness attribute property value 6D for the certificate as a whole. Credential attribute 4N relates to a credit limit, having a credit limit numerical attribute property value 6W and a trustworthiness attribute property value 6X (for credential attribute 4N).

The trust function 8 is embedded in the certificate 2 as an executable file of platform portable code such as Java script or HTML.

Figure 2:
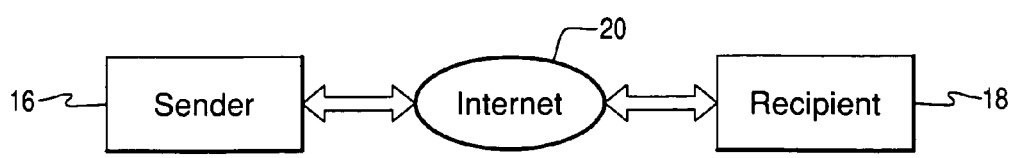
FIG. 2 is a schematic representation of a distributed electronic network over which the present invention may be used.

The certificate 2 is communicated via a distributed electronic network, such as the internet, as shown schematically in FIG. 2 of the drawings that follow, in which a sender 16 communicates with a recipient 18 via the internet, indicated schematically at 20. Communication can be via other distributed electronic networks, such as Wide Area Networks (WANs) or Local Area Networks (LANs). Embodiments of the present invention can also be implemented in other, less preferred, ways, for instance by storing a certificate on a digital storage device (e.g. a floppy disk) and sending this to the recipient 18.

Upon receipt of the digital certificate 2, the recipient 18 inspects the digital signature 10 to verify the certificate 2. Having done so, the recipient 18 executes the trust function 6 which operates on some or all of the credential attribute properties 6A, 6B, 6C, 6D, 6W and 6X to determine and output a trust value for the certificate 2.

If external data is required, this is obtained from external data source 12.

By way of example, the certificate may be for a credit rating for a bearer of the certificate. The credit limit in the credential attribute property 6W may be, say, £10,000. Trust function 8 extracts the trust value credential attribute property values 6C, 6D, 6X and averages these to produce a trust value 14 for the certificate.

This is a fairly simple example. Many variations exist, for instance, the trust function 8 need not be a simple average. It could weight one value more than another. Another option is that data is obtained from an external data source 12, for instance a date or a current account balance. The trust function need not use data from the certificate at all. Further, not just trust values need be used. For instance the trust value may be a function of time (generally trust will decrease over time).

Figure 3:
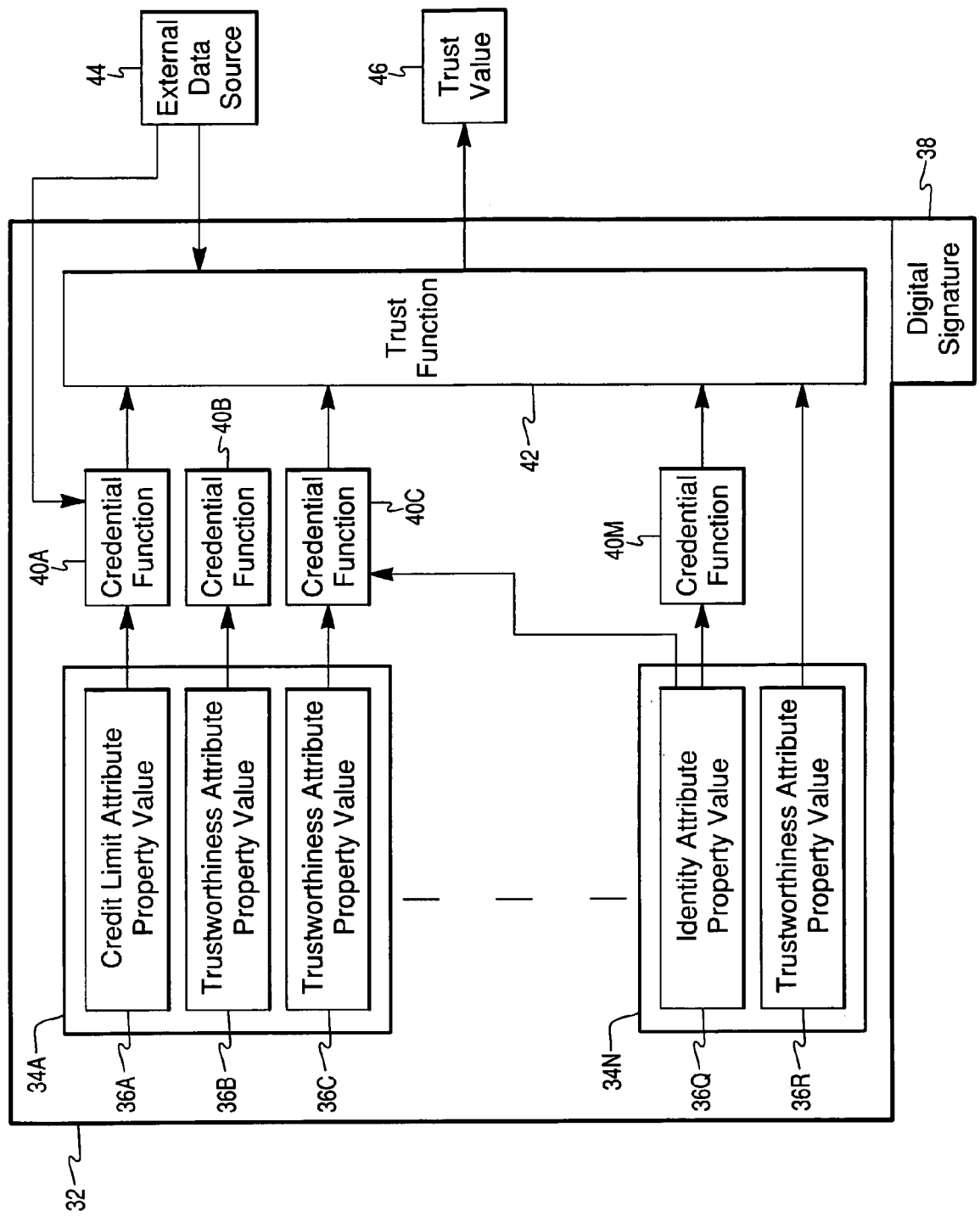
FIG. 3 is a schematic representation of a digital certificate according to a second embodiment of the present invention.

Referring to FIG. 3 of the drawings that follow, there is shown a schematic representation of a digital certificate 32 having a plurality of credential attributes 34A–34N with associated credential attribute properties 36A–36R. The certificate 32 is signed, as indicated at 38. Digital certificate 32 corresponds to digital certificate 2 of F*igure* 1, except that in digital certificate 32 there is also a plurality of corresponding credential functions 40A–40M. A trust function is indicated at 42 and an external data source at 44.

In this example credential attribute 34A is a credit limit, having properties of a value 36A and an indication of trustworthiness 36B. Other properties 36C etc. may be included. Credential attribute 34N is an identity having a value 36Q and an indication of trustworthiness 36R. Each function 40A–40M is capable of modifying a respective credential attribute property 36A–36R to determine a respective credential attribute property value obtaining external data as required as indicated at 44.

The credential functions 40, in this case, may be a modifier of an existing credential attribute value. Pursuing the example of the credit rating, the function 40 may be to reduce the rating by 10% of the original rating for each month. Applying the function 40 to the attribute property 36 above, the function obtains date information and in the second month the credential attribute value 4 is determined as £9,000 and so on. Date information may be obtained from the recipient computer or, for more security, from a trusted source, preferably a trusted source web site. These are digital data sources.

Trust function 42 receives the generated credential attribute property values from credential functions 40A–40M and operate a trust value 46 output indicative of the trust in the certificate. External data may be obtained, as required, from external data source 44.

The credential function is embedded in the certificate as an executable file of platform portable code such as Java script or HTML.

In another example the credential attribute property 36 may be an access authorization for a building to which the provider of the certificate 32 only wishes to allow the certificate bearer access on specified times, say week days only. The credential attribute property 36 would have a value of "PERMIT ACCESS" in this case. The credential function 40 is, therefore, encoded to determine the day of the week (for instance from a computer on which the certificate 32 is being verified, or from a remote web-site) and generate a modified credential attribute property value which is "DO NOT PERMIT ACCESS" at week ends. It will be appreciated from this that the credential attribute property 36 will not always be modified by function 40.

Alternatively, the credential attribute property 36 may not have an original value in the certificate. Instead, it may solely be generated by a credential function which (generally) obtains data externally of the certificate.

There may be a one-to-one correlation between each credential attribute property 34A–36R and its corresponding credential function 40A–40M, though this need not be the case. For instance, one or more, but not necessarily all, of the credential attribute properties 36A–36R need have a credential function 40 for generation thereof. Further, a given credential function 40A–40M may be used for a plurality of credential attribute properties 36A–36R, in which case there may be fewer credential functions 40 than credential attribute properties 36.

In the certificates 2 and 32, it will be appreciated that many of the fields present in an X.509 certificate are not represented. These may include fields containing data to allow a credential attribute property value to be determined or evaluated according to the second credential function. For instance, these fields may include a credential start date.

The certificate 32 may provide the recipient with determined credential attribute property values relevant to one or more attributes therein as well as to the trust function 42.

The trust and credential functions can seek information from elsewhere on which to base its generation of the credential attribute property value. For instance, the functions can access local time data or extract data from a web-site as required, as described above. Alternatively, in a less preferred option, data can be sought from the recipient of the certificate in response to an inquiry generated by the credential attribute function. This option is less preferred as it makes the certificate less self-contained. In some embodiments all data for the credential attribute property value originates externally of the certificate.

Thus, the trust function within the certificate can operate automatically to produce a trust value which can vary over time and dynamically according to external data. A certification authority need not be involved in the variation of the trust value after issue, though optionally they may be.

The digital certificate may, optionally, be encrypted.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A digital certificate embodied on a computer readable medium executable on a computing system, comprising:
    a plurality of credential attribute properties; and
    a trust function embedded within the digital certificate as an executable program file. which trust function has data and can determine as a function of data available to it a trust value attributable to at least a part of the digital certificate at least partly when the executable program file is executed,
    in which the trust function varies the trust value as a function of time.

2. A digital certificate embodied on a computer readable medium executable on a computing system, comprising:
- a plurality of credential attribute properties; and
- a trust function embedded within the digital certificate as an executable program file, which trust function has data and can determine as a function of data available to it a trust value attributable to at least a part of the digital certificate at least partly when the executable program file is executed,
- in which a credential function is provided in the certificate, which credential function is associated with at least one credential attribute property and which determines the value of the credential attribute property.
- in which the credential function varies the credential attribute property value as a function of time.

* * * * *